(No Model.) 2 Sheets—Sheet 1.

W. D. PUFFER.
DEVICE FOR STORING CASKS.

No. 548,090. Patented Oct. 15, 1895.

WITNESSES:
William P. Goebel.
J. Fred Acker.

INVENTOR
W. D. Puffer
BY
Munn & Co.
ATTORNEYS.

ANDREW B.GRAHAM, PHOTO-LITHO. WASHINGTON, D.C.

(No Model.) 2 Sheets—Sheet 2.

W. D. PUFFER.
DEVICE FOR STORING CASKS.

No. 548,090. Patented Oct. 15, 1895.

WITNESSES:
William P. Gaebel
Fred Acker

INVENTOR
W. D. Puffer
BY Munn & Co.
ATTORNEYS.

UNITED STATES PATENT OFFICE.

WILLIAM D. PUFFER, OF NORTH ADAMS, MASSACHUSETTS.

DEVICE FOR STORING CASKS.

SPECIFICATION forming part of Letters Patent No. 548,090, dated October 15, 1895.

Application filed June 25, 1895. Serial No. 554,029. (No model.)

*To all whom it may concern:*

Be it known that I, WILLIAM D. PUFFER, of North Adams, in the county of Berkshire and State of Massachusetts, have invented a new and Improved Device for Storing Casks, &c., of which the following is a full, clear, and exact description.

My invention relates to a device for storing casks and other articles, and it has for its object to provide a rack adapted to receive the articles to be stored and a cage held to travel on the rack, provided with tracks capable of registry with tracks secured to the rack, and a hoisting device located on the carriage, whereby the cask or other article may be elevated to any desired point on the rack and placed upon a truck to be carried to any desired compartment of said rack, means being also provided for guiding the cage in its movement in front of the rack and also for locking the cage and rack together when desirable.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the views.

Figure 2:
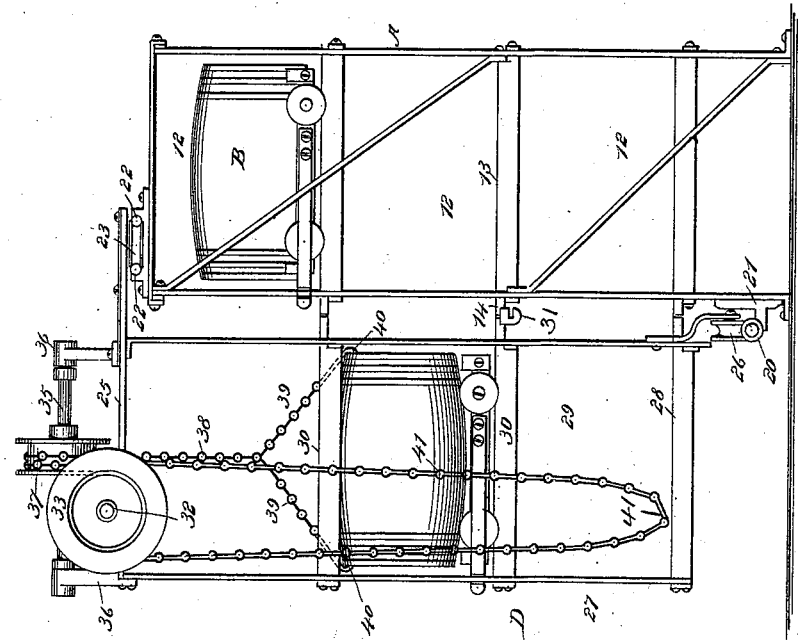
Figure 1:
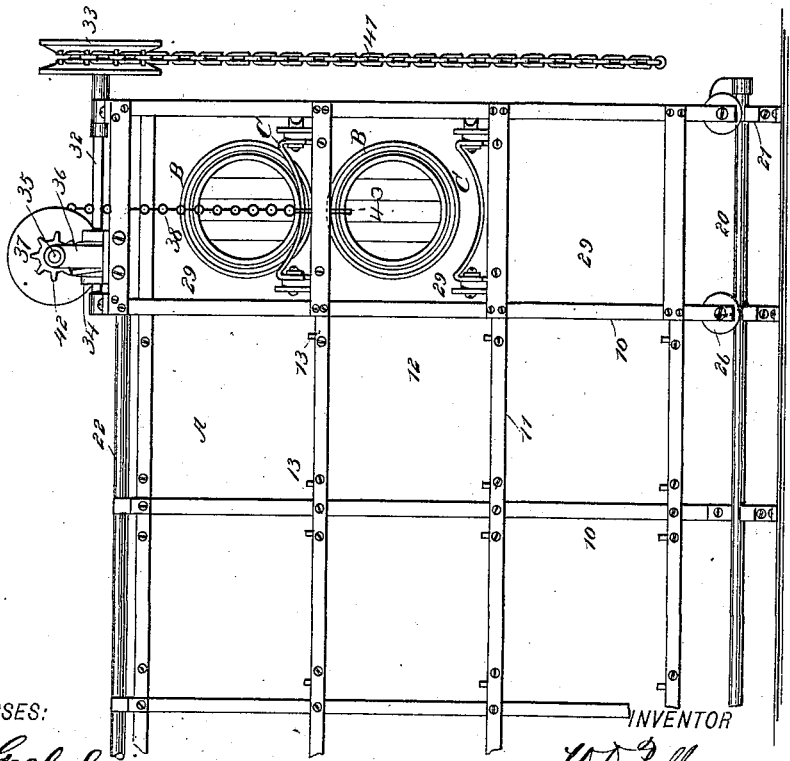
Figure 3:
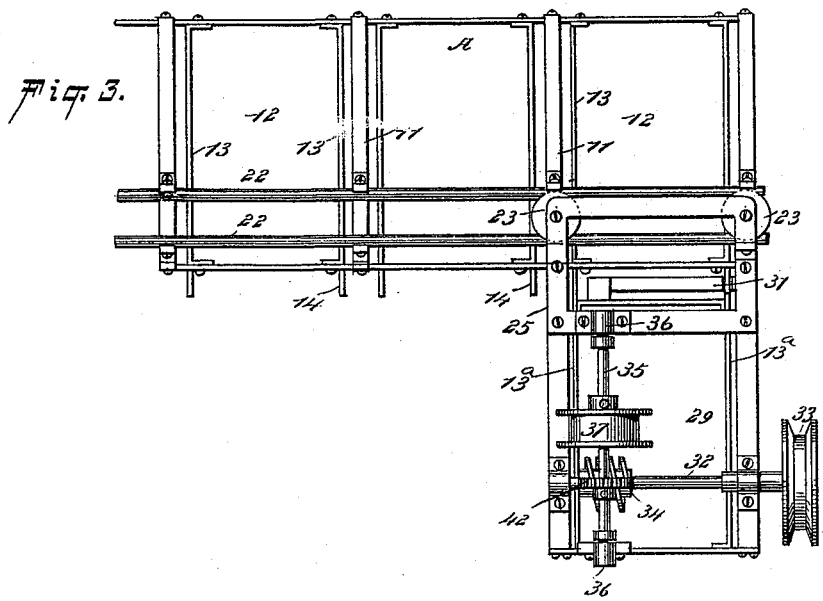
Figure 4:
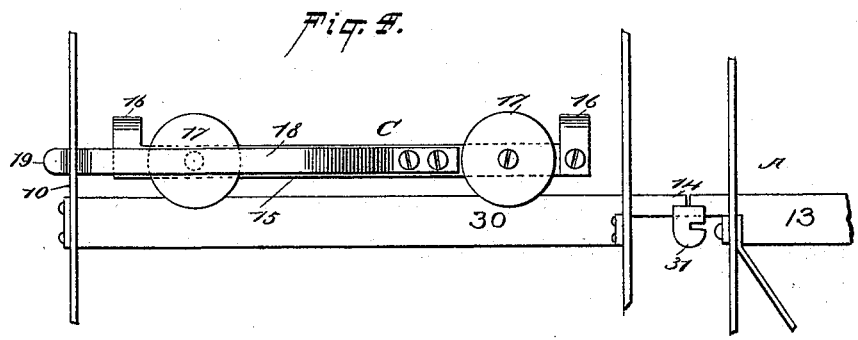

Figure 1 is a front elevation of a portion of the rack and the cage held to travel in front thereof. Fig. 2 is an end view of the rack and of the cage. Fig. 3 is a plan view of a portion of the rack and cage. Fig. 4 is a side elevation of one of the trucks located on the track of the said cage, and Fig. 5 is a plan view of one side of the truck shown in Fig. 4.

In carrying out the invention a stationary rack A is employed, which may be placed at any convenient point, and the rack consists of a framework, including uprights 10 and horizontal cross-bars 11, the uprights and the cross-bars being so arranged as to form a series of cells 12, adapted for the reception of casks B or other articles to be stored, and in each of these cells 12 tracks 13 are laid, and the said tracks are preferably made to extend beyond the front of the rack, as shown at 14 in Figs. 2 and 4, the extensions of the tracks being preferably of reduced width.

Figure 5:
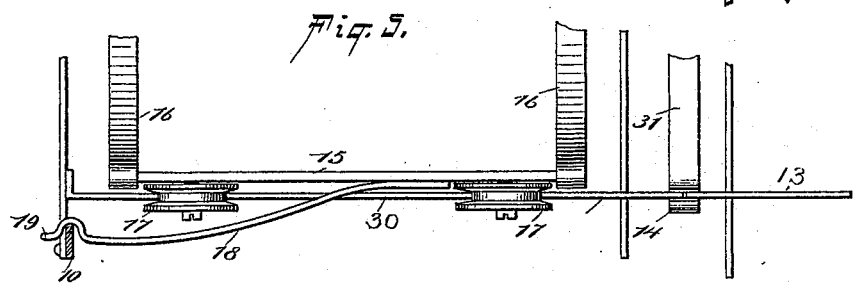

These tracks are adapted to receive trucks C, and the said trucks comprise a frame consisting of side bars 15, front and rear bars 16, more or less concaved on their upper faces, and wheels 17, journaled upon the said side bars and adapted to travel on the aforesaid tracks 13, together with a spring-arm 18, attached to one or to both sides of the truck and provided with a hook or keeper 19 at their free ends adapted when the truck is in proper position within the cell to be in locking engagement with one of the uprights 10 of the rack-frame, as shown in Fig. 5.

A rail 20 is secured upon brackets 21, located at the front base portion of the rack and extending practically from end to end, while upon the top of the rack at the front two parallel rails 23 are securely fastened, and these rails receive between them peripherally-grooved wheels 22, which are journaled upon a horizontal frame 25. The horizontal frame 25 has attached to it a cage D, and this cage is removed a predetermined distance from the front face of the rack, as shown in Fig. 2, the lower portion of the cage at its back being provided with peripherally-grooved wheels 26, adapted to travel upon the lower or supporting track 20 of the rack.

The cage is preferably of skeleton construction, being open throughout from top to bottom, and is composed of series of uprights 27, connected by cross-bars 28, and the cage is practically of a width and height corresponding to the vertical tier of cells 12 in the rack, and each compartment or cell 29 in the cage is provided with tracks 30, adapted when the cage is brought in front of the tier of cells in the rack to register with the forwardly-projecting ends of the tracks in the said rack-cells, and in order that the cage may be locked in position in front of any vertical tier of cells said cage is provided with one or more spring-arms 31, which are adapted to clamp the abutting extending ends of the tracks of the cells in the rack and in the cage.

A lifting mechanism forms a part of the cage. This lifting mechanism consists of a longitudinal shaft 32, or a shaft extending parallel with the rack, and this shaft at one of its ends is provided with a peripherally-grooved sprocket or chain wheel 33 and with a worm 34 near its opposite end. A second shaft 35 crosses the worm or driving shaft 32, being journaled in suitable bearings 36, placed upon the front and rear of the cage, and a drum 37 is secured upon the driven shaft 35 over what may be termed the "central portion" of the cage at or near one of its sides, and a lifting chain 38 is secured to this drum, terminating at its lower end in two or more members or strands 39, each being provided with a lug 40 or equivalent clamp for engagement with the chine of a barrel or with any object that is to be lifted. An endless driving-chain 41 is passed over the toothed surface of the sprocket-wheel 33 on the driving or worm shaft.

In operation the cage is carried in front of the tier of cells in the rack adapted to be filled and is secured in such position by means of the aforesaid locking-arms 31. The cask or other article to be elevated is rolled under the cage and the lifting-chain is lowered also by properly manipulating the driving-chain 41, and after the grapples or clamps have been placed on the cask or other article to be lifted the driving-chain 41 is drawn in the reverse direction, and the article is thereby raised until it reaches a predetermined cell in the cage. Arriving at this point it will not back down by reason of the worm 34 meshing with a worm-wheel 42, located on the driven shaft 35, and by means of this worm and worm-wheel the said driven shaft is operated and the hoisting-chain raised or lowered. The car or truck C is then drawn from the cell in the rack opposite that in the cage in which the article is located and is carried beneath the said article, which latter is lowered until it rests on the truck, whereupon the truck is rolled into the cell in the rack in which the article is to be stored.

It is evident that the cage may be readily placed in front of any tier of cells in the rack, and that articles may be expeditiously and conveniently loaded in the said cells.

Having thus fully described my invention, I claim as new and desire to secure by Letters Patent—

1. The combination, with a rack containing a series of cells adapted for the storage of articles, of a cage held to travel adjacent to the said rack and provided with correspondingly located cells or compartments, and a hoisting device located on the said cage, as and for the purpose specified.

2. The combination, with a rack containing a series of compartments or cells, of a cage having guided movement on the said rack and traveling along the face thereof provided with cells or compartments correspondingly situated to the tiers of cells or compartments in the rack, tracks located in the cells in the rack and the cage, the tracks in opposing cells being adapted to register, a locking device adapted for engagement with abutting tracks, and a hoisting mechanism located upon the said cage, as and for the purpose set forth.

3. The combination, with a rack containing a series of compartments or cells, of a cage having guided movement on the said rack and traveling along the face thereof, provided with cells or compartments correspondingly situated to the tiers of cells or compartments in the rack, tracks located in the cells in the rack and in the cage, the tracks in opposing cells being adapted to register, a locking device adapted for engagement with abutting tracks, a hoisting mechanism located upon the said cage, trucks located on the tracks of the rack cells, and adapted to travel on the tracks located in the corresponding cells of the cage, locking devices carried by the said trucks, and means, substantially as shown and described, for placing said devices in locking engagement with the frame of either the rack or the cage, as and for the purpose specified.

4. The combination, with a rack provided with cells or compartments for storage purposes, and a cage having cells or compartments arranged correspondingly to those in the rack, the said cage having a supported and sliding movement upon the rack and moving across the face thereof, of a drive shaft provided with a worm, a driving wheel secured to the shaft and operated by a chain, a second shaft provided with a drum located over the cage, a worm wheel on the said driven shaft and meshing with the worm on the drive shaft, and a hoisting chain or cable carried by the said drum, as set forth.

WILLIAM D. PUFFER.

Witnesses:
GEORGE OSTEYEE,
WILLIAM H. WOODHEAD.